(12) United States Patent
Gavin

(10) Patent No.: US 7,387,468 B2
(45) Date of Patent: Jun. 17, 2008

(54) ORIFICE SHIELD FOR DRAINAGE PIPE

(75) Inventor: Peter W. Gavin, Durham, CT (US)

(73) Assignee: The Peter Gavin Spray Trust, Wallingford, CT (US)

( * ) Notice: Subject to any disclaimer, the term of this patent is extended or adjusted under 35 U.S.C. 154(b) by 88 days.

(21) Appl. No.: 11/353,402

(22) Filed: Feb. 14, 2006

(65) Prior Publication Data

US 2006/0192034 A1 Aug. 31, 2006

Related U.S. Application Data

(60) Provisional application No. 60/655,384, filed on Feb. 22, 2005.

(51) Int. Cl.
*E02B 13/00* (2006.01)

(52) U.S. Cl. .................. 405/41; 239/596; 239/602

(58) Field of Classification Search .................. 405/40, 405/41; 239/596, 602
See application file for complete search history.

(56) References Cited

U.S. PATENT DOCUMENTS

| | | | |
|---|---|---|---|
| 953,080 A * | 3/1910 | Wiggins | 405/48 |
| 2,798,768 A * | 7/1957 | Babin | 239/145 |
| 2,987,262 A * | 6/1961 | Goyette et al. | 239/550 |
| 3,729,142 A | 4/1973 | Rangel-Garza et al. | |
| 3,901,448 A * | 8/1975 | Babin | 239/145 |
| 4,094,466 A * | 6/1978 | DeRomano | 239/145 |
| 4,182,583 A * | 1/1980 | McEntyre | 405/48 |
| 4,392,616 A | 7/1983 | Olson | |
| 4,626,130 A | 12/1986 | Chapin | |
| 5,752,784 A | 5/1998 | Motz et al. | |
| 5,908,266 A * | 6/1999 | Miller | 405/41 |
| 6,015,102 A | 1/2000 | Daigle et al. | |
| 6,113,311 A * | 9/2000 | Becker et al. | 405/119 |
| 6,749,367 B1 * | 6/2004 | Terry, III | 405/48 |

\* cited by examiner

*Primary Examiner*—Tara L. Mayo
(74) *Attorney, Agent, or Firm*—Wiggin and Dana LLP; Anthony P. Gangemi; Gregory S. Rosenblatt

(57) ABSTRACT

An orifice shield for distributing water flowing from an orifice in a pipe and preventing blockage of the orifice. The orifice shield includes a housing including a cage, the cage being defined by a first plate joined to a second plate via fins, the fins being joined via a plurality of lateral members, the cage including a plurality of openings or slots defined between the fins and the lateral members, the first plate including a central shaft extending downwardly toward the second plate. A freely rotating fan is mounted on the shaft. The fan is adapted to evenly distribute the water flowing from the orifice via the openings or slots. The housing may also be a box housing including a plurality of openings or slots defined therein. The housing includes a first clamp and a second clamp that are adapted to be removably secured to the pipe.

6 Claims, 10 Drawing Sheets

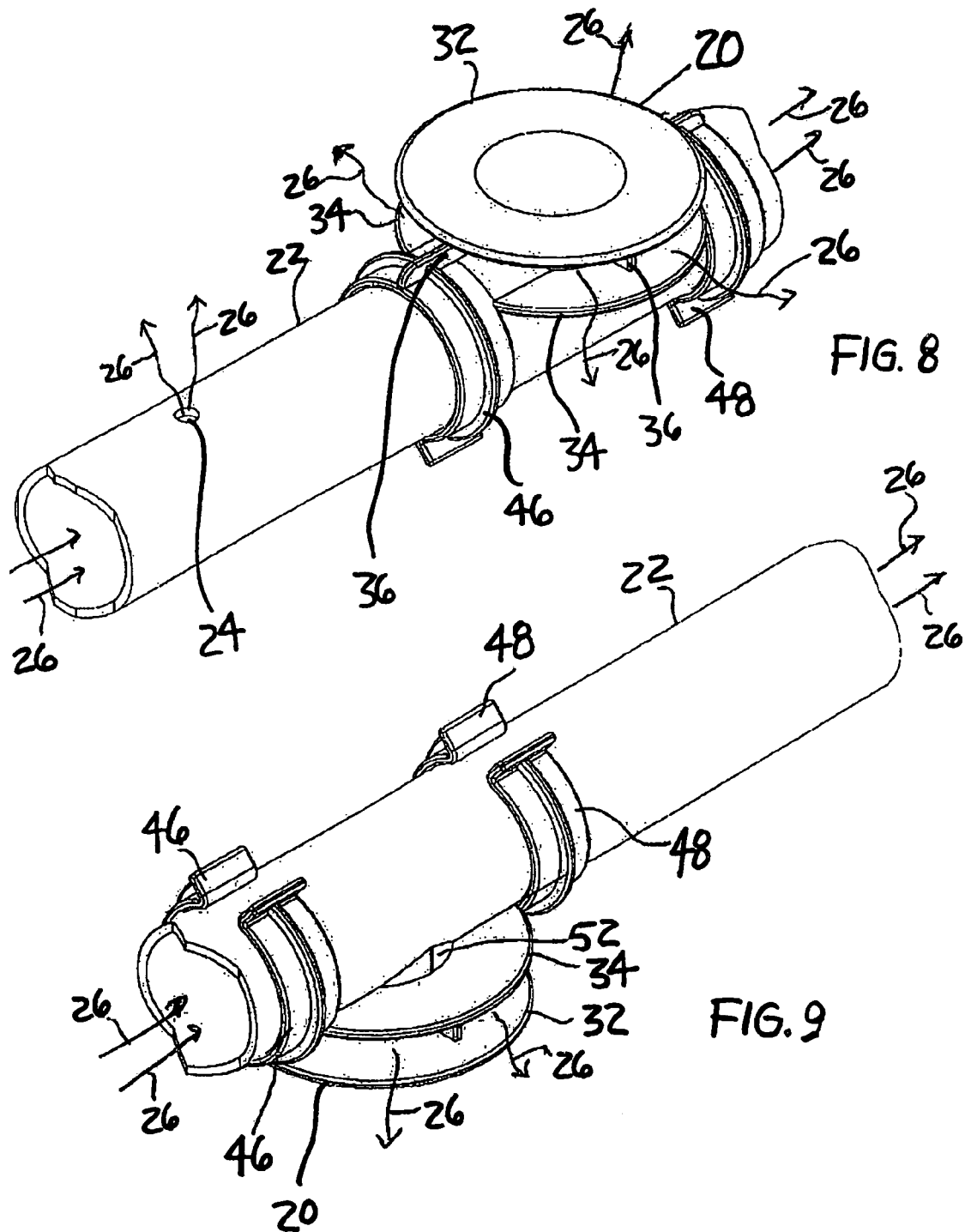

ORIFICE SHIELD FOR DRAINAGE PIPE

CROSS-REFERENCE TO RELATED APPLICATIONS

This application claims the benefit of U.S. Provisional Application No. 60/655,384, filed Feb. 22, 2005.

BACKGROUND OF THE INVENTION (1) Field of the Invention

The present invention generally relates to a septic system fluid control. In particular, the present invention is directed to a diffuser that attaches over a lateral orifice in a septic system subterranean pipe that diffuses filtered wastewater to the soil surrounding the pipe and prevents plugging of the orifice by the soil. The diffuser may also be used on water distribution pipes of soil irrigation systems.

(2) Description of the Related Art

In typical septic system designs, orifice shields are used to evenly distribute effluent, prevent soil erosion around the orifices, and prevent blockage of the orifices from the surrounding soil.

Typical orifice shields employ a box-like structure that fits over the orifice. As a result, typical orifice shield designs generally do not allow for dispersion of effluent over a 360° area of soil. Also, typical orifice shield designs are only adapted to fit on either the top or bottom portion of a pipe and not both. Many typical orifice shield designs are also limited in the number of sizes they will adhere to, thereby requiring a plurality of model sizes. Finally, many typical orifice shield designs do not adequately protect orifices from becoming blocked by surrounding soil and blocks.

BRIEF SUMMARY OF THE INVENTION

One aspect of the present invention is an orifice shield for distributing water flowing from an orifice in a pipe and preventing blockage of the orifice. The orifice shield includes a housing including a cage. The cage is defined by a first plate joined to a second plate via fins. The fins are joined via a plurality of lateral members. The cage has a plurality of openings or slots defined between the fins and the lateral members. The first plate includes a central shaft extending downwardly toward the second plate. A freely rotating fan is mounted on the shaft. The fan is adapted to evenly distribute the water flowing from the orifice via the openings or slots. A first clamp extends from the first plate and a second clamp from the second plate. The first and second clamps are adapted to be removably secured to the pipe.

Another aspect of the invention is an orifice shield for distributing water flowing from an orifice in a pipe and preventing blockage of the orifice. The orifice shield includes a box housing having sidewalls, end walls, and a top plate. The sidewalls include a plurality of openings or slots defined therein. The openings or slots are sized so as to allow the water flowing from the orifice to exit the box housing while preventing solids to enter the box housing. A first clamp extends from a first end wall and a second clamp extends from a second end wall. The first and second clamps are adapted to be removably secured to the pipe.

Still another aspect of the invention is an orifice shield for distributing water flowing from an orifice in a pipe and preventing blockage of the orifice. The orifice shield includes a housing having a cage. The cage is defined by a first plate joined to a second plate via fins. The fins are joined via a plurality of lateral members. The cage includes a plurality of openings or slots defined between the fins and the lateral members. The first plate includes a central shaft extending downwardly toward the second plate. The orifice shield also includes a mechanism for evenly distributing the water flowing from the orifice via the openings or slots and mechanisms for removably securing the housing to the pipe.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein:

FIG. 8 is a top front perspective view of the shield of FIG. 1 mounted on a section of septic system water dispersal pipe;

FIG. 9 is a bottom back perspective view of the shield and pipe of FIG. 8;

DETAILED DESCRIPTION

Figure 1:
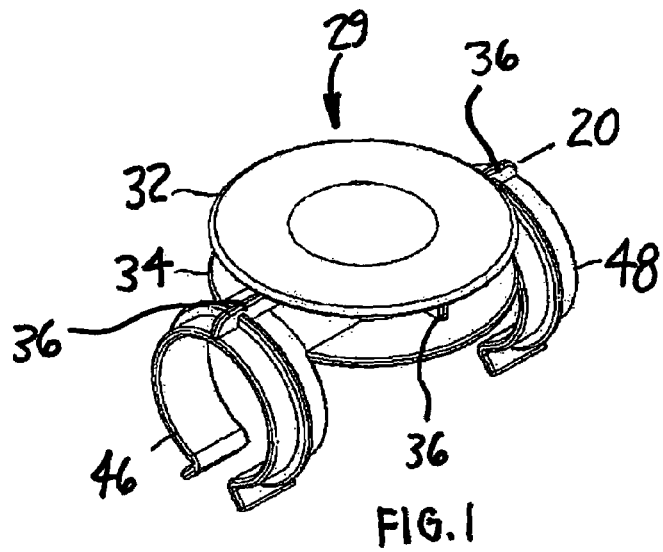
FIG. 1 is a is a top front perspective view of an orifice shield according to one embodiment of the invention.
Figure 2:
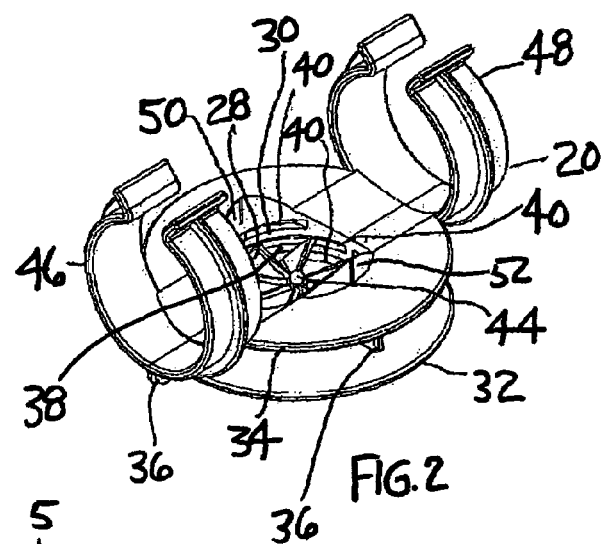
FIG. 2 is a bottom back perspective view of the shield of FIG. 1.
Figure 3:
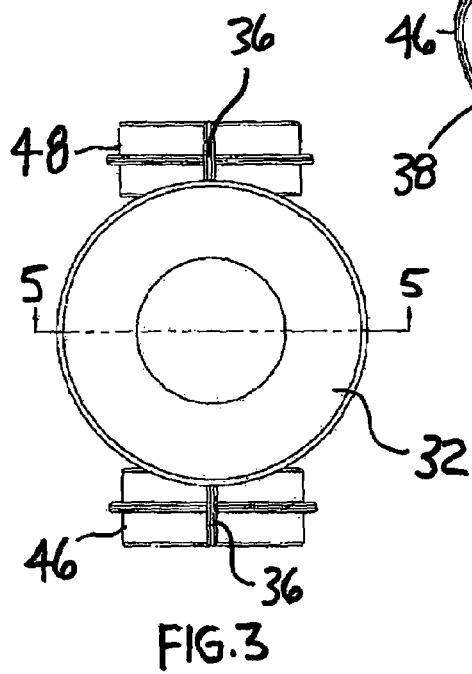
FIG. 3 is a top view of the shield of FIG. 1.
Figure 4:
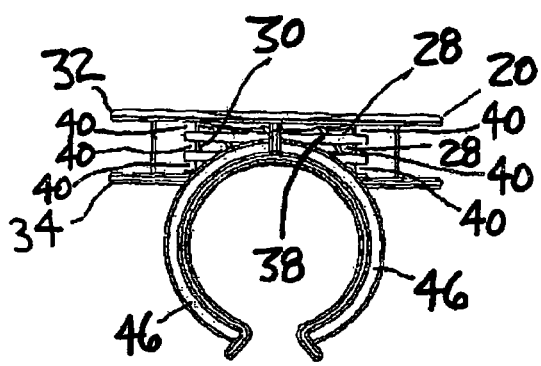
FIG. 4 is a front view of the shield of FIG. 1.
Figure 5:
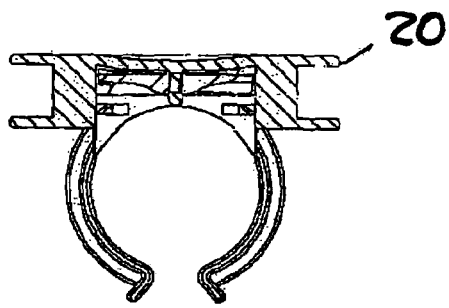
FIG. 5 is a cross section view of the shield of FIG. 3 taken along line 5-5.
Figure 6:
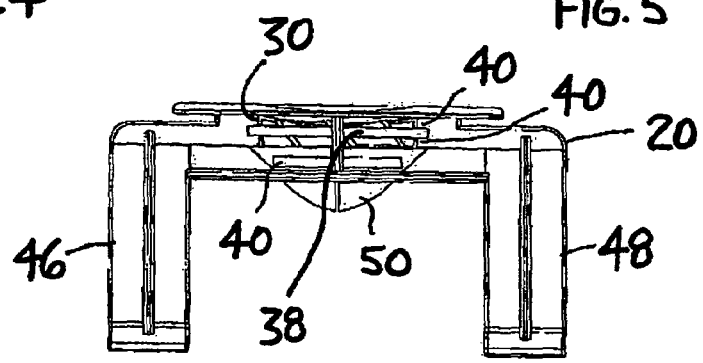
FIG. 6 is a side view of the shield of FIG. 1.
Figure 7:
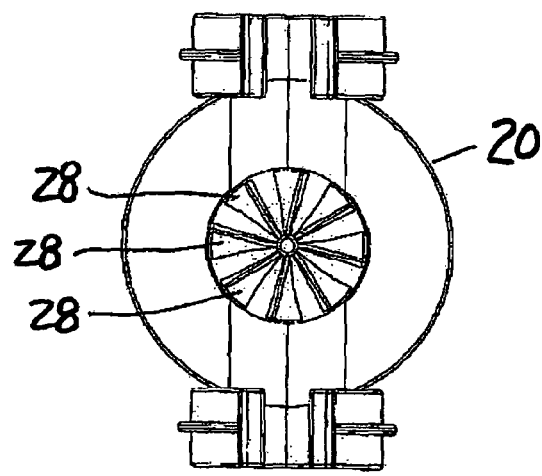
FIG. 7 is a bottom view of the shield of FIG. 1.
Figure 10:
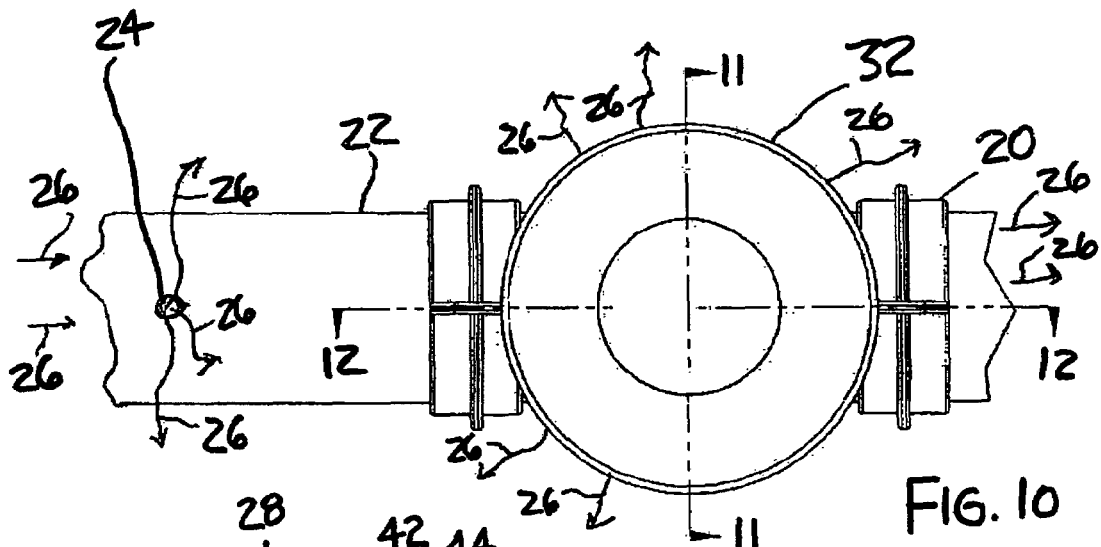
FIG. 10 is a top view of the shield and pipe of FIG. 8.
Figure 11:
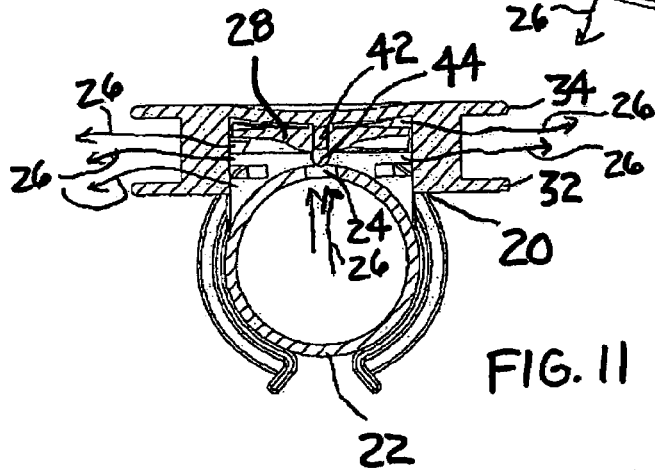
FIG. 11 is a cross section view of the shield and pipe of FIG. 10 taken along line 11-11.
Figure 12:
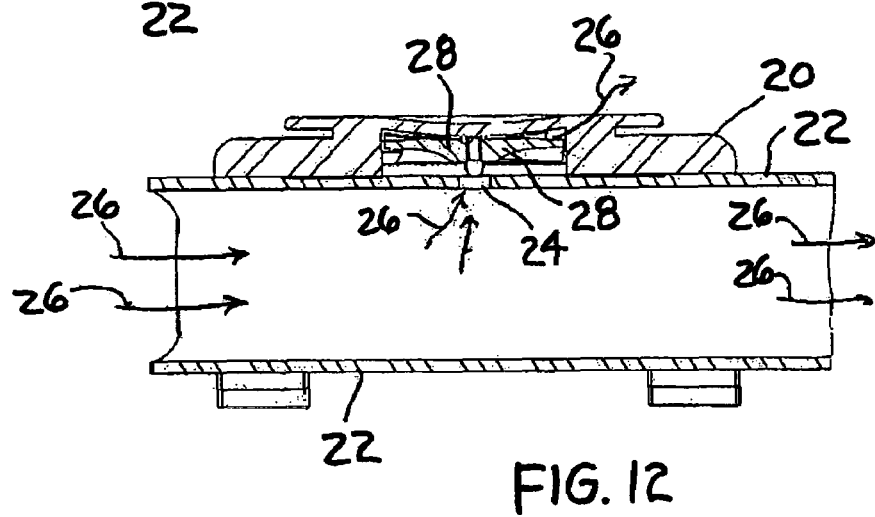
FIG. 12 is a cross section view of the shield and pipe of FIG. 10 taken along line 12-12.
Figure 13:
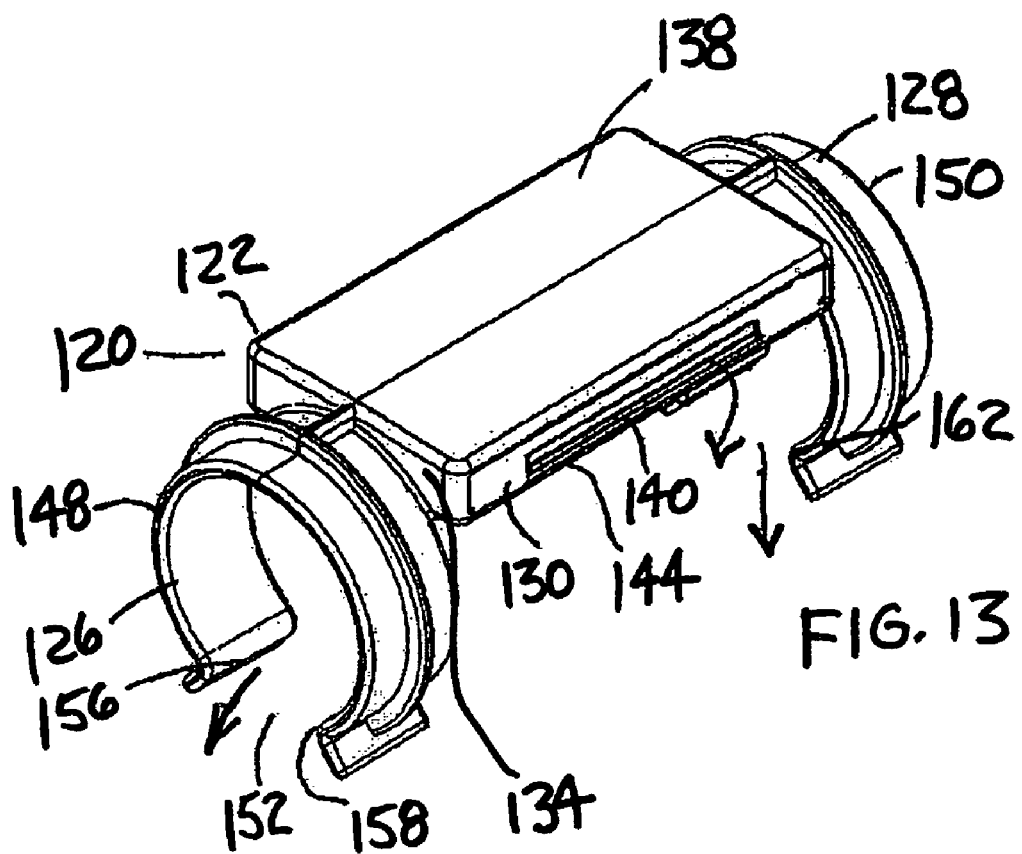
FIG. 13 is a top front perspective view of an orifice shield according to one embodiment of the invention.
Figure 14:
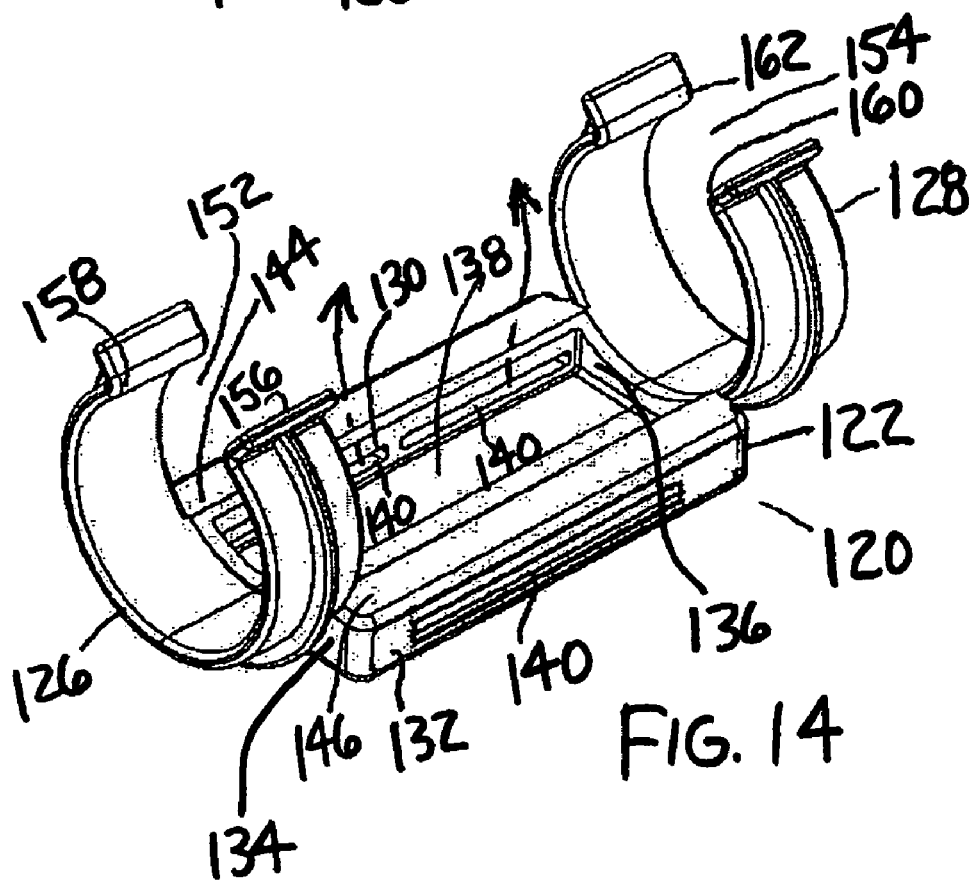
FIG. 14 is a bottom back perspective view of the orifice shield of FIG. 13.

Referring now to the drawings in which like reference numerals indicate like parts, and in particular, to FIGS. 1-12, one aspect of the present invention is a an orifice shield 20 that is mounted on a septic system pipe 22 to prevent soil and other material from entering an orifice 24 in the pipe and to distribute a portion of water flow 26 through the pipe, which passes laterally (as indicated by arrows) through the orifice, into the orifice shield, and exits the orifice shield into the soil. In the embodiment shown in FIGS. 1-12, orifice shield 20 includes a fan 28 that helps uniformly distribute effluent over a 360° arc.

Orifice shield 20 includes a housing 29 that defined by an annular cage 30, which includes a first plate 32 joined to a second plate 34 via a plurality of fins 36. Of course, in other embodiments, housing 29 may not be annular in shape. A plurality of annular lateral members 38 span between each of plurality of fins 36 to define a plurality of slots 40 between plates 32 and 34. First plate 32 includes a center shaft 42 that extends downwardly toward second plate 34. Fan 28 is mounted on center shaft 42 in a coaxial arrangement with first plate 32. A pin 44 may be used to secure fan 28 to center shaft 42.

Second plate 34 is joined to two C-shaped clamps 46 and 48, which are used to removably adhere orifice shield 20 to septic system pipe 22. Clamps 46, 48 are preferably elastic enough to spread and slip laterally over septic system pipe 22, and then move together to grip the pipe so that orifice shield 20 stays over orifice 24. Clamps 46, 48 are preferably integral to orifice shield 20. Second plate 34 also includes tabs 50 and 52, which extend downwardly away from both first plate 32 and the second plate and are in elastic contact with septic system pipe 22.

In use, water flow 26 from orifice 24 drives fan 28, which spins on shaft 42 in annular cage 30. Water flow 26 typically flows at about 1-10 psi. Orifice 24 is typically about 1/16", 1/8", or 1/4" in diameter. Fan 28 causes water flow 26 to be distributed radially out of orifice shield 20 through slots 40 between plates 32, 34. Fan 28 can be any shape that may be driven by water flow 26 and is capable of expelling the water through slots 40. Orifice shield 20 is typically centered over a single orifice 24, but may be mounted over a plurality of orifices that are set in a line or grouped.

Referring now to FIGS. 13-19, another embodiment is an orifice shield 120, which includes a box housing 122 that is mounted to a septic system pipe 124 via C-shaped claims 126 and 128.

Figure 15:
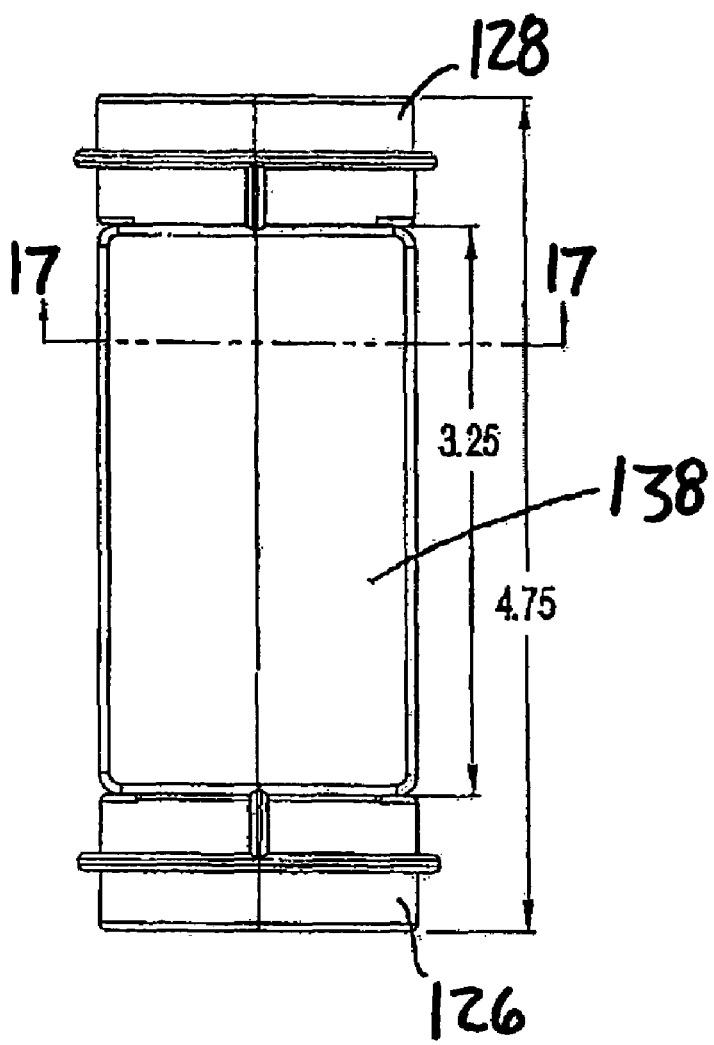
FIG. 15 is a top view of the shield of FIG. 13.
Figure 16:
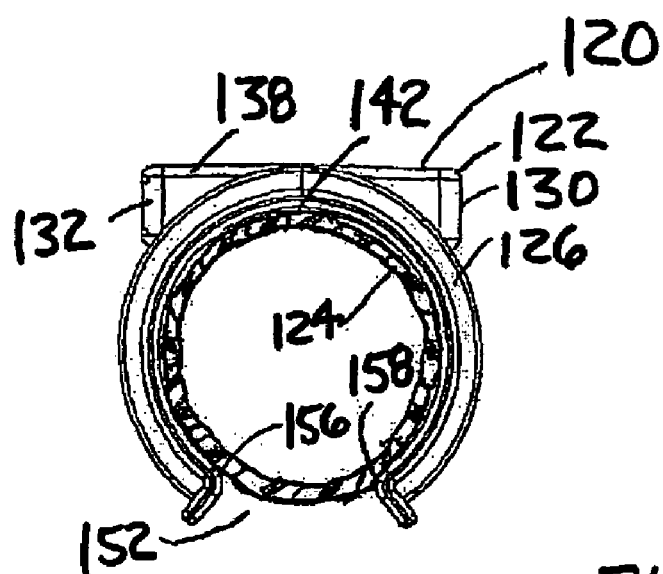
FIG. 16 is a front view of the shield of FIG. 13 mounted on a septic system pipe designed to dispose of waste water through holes through the wall of the pipe.
Figure 17:
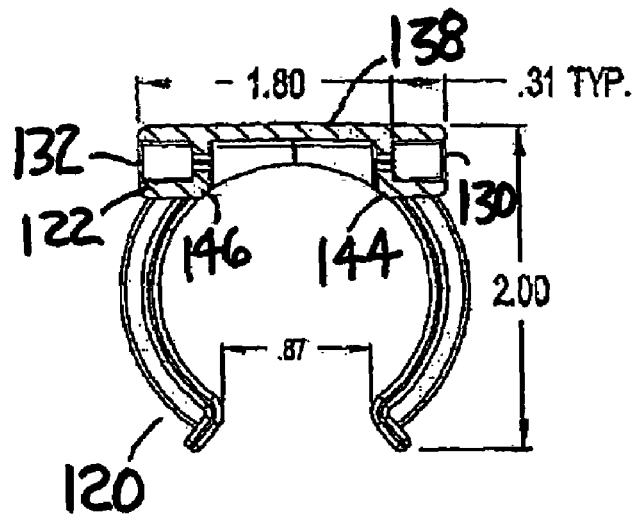
FIG. 17 is a cross section view of the shield of FIG. 16 taken along line 17-17.
Figure 18:
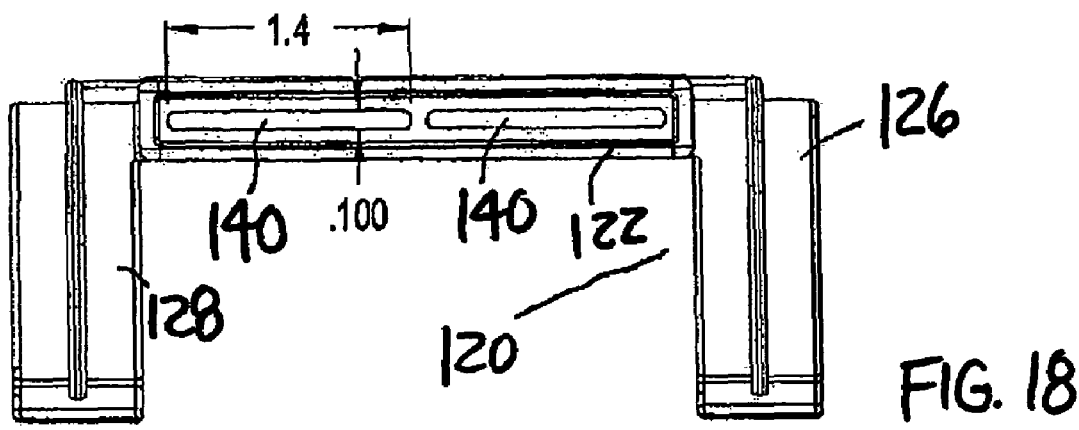
FIG. 18 is a side view of the shield of FIG. 13.

Box housing 122 includes longitudinal walls 130 and 132, which correspond to the longitudinal dimension of septic system pipe 124. Longitudinal walls 130 and 132 are joined with end walls 134 and 136, respectively. A plate 138 caps longitudinal walls 130, 132 and end walls 134, 136 to form box housing 122. Each of longitudinal walls 130 and 132 have emission slots or holes 140 defined therein. Longitudinal walls 130, 132 generally have a height sufficient so that plate 138 is spaced above and not in contact with septic system pipe 124. For additional support of plate 138 against soil pressure, the plate may be allowed to contact septic system pipe 124 at a centerline 142 of plate 48. Longitudinal walls 130 and 132 terminate at longitudinal edges 144 and 146, respectively, which are opposite plate 138. Typically, longitudinal edges 144, 146 are adjacent to and or in contact with septic system pipe 124. Orifice shield 120 is generally sized to fit 1¼", 1½", and 2" schedule 40 pipe, but may also be sized to fit other types of pipe. FIGS. 15, 17, and 18 include exemplary dimensions of one particularly sized orifice shield 120. In one embodiment, orifice shield 120 is made of HDPE. Of course, in other embodiments orifice shield 120 may be fabricated from other materials with characteristics similar to HDPE.

C-shaped clamps 126 and 128 are joined to box housing 122 at end walls 134 and 136, respectively. Clamps 126, 128 are typically molded in one piece with box housing 122. Orifice shield 120 may be removably fastened to septic system pipe 124 via clamps 126, 128. Clamps 126, 128 are open at ends 148 and 150, respectively, of orifice shield 120 to receive septic system pipe 124 therethrough. Clamps 126 and 128 are generally resilient enough to slip laterally (as indicated by arrows) onto septic system pipe 124 by way of openings 152 and 154 and grip the pipe by ends 156, 158, 160, and 162 without cracking or breaking.

Figure 19:
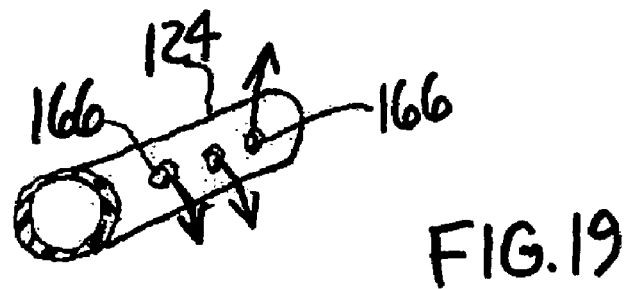
FIG. 19 is a perspective view of a section of septic system pipe showing drain holes.
Figure 20:
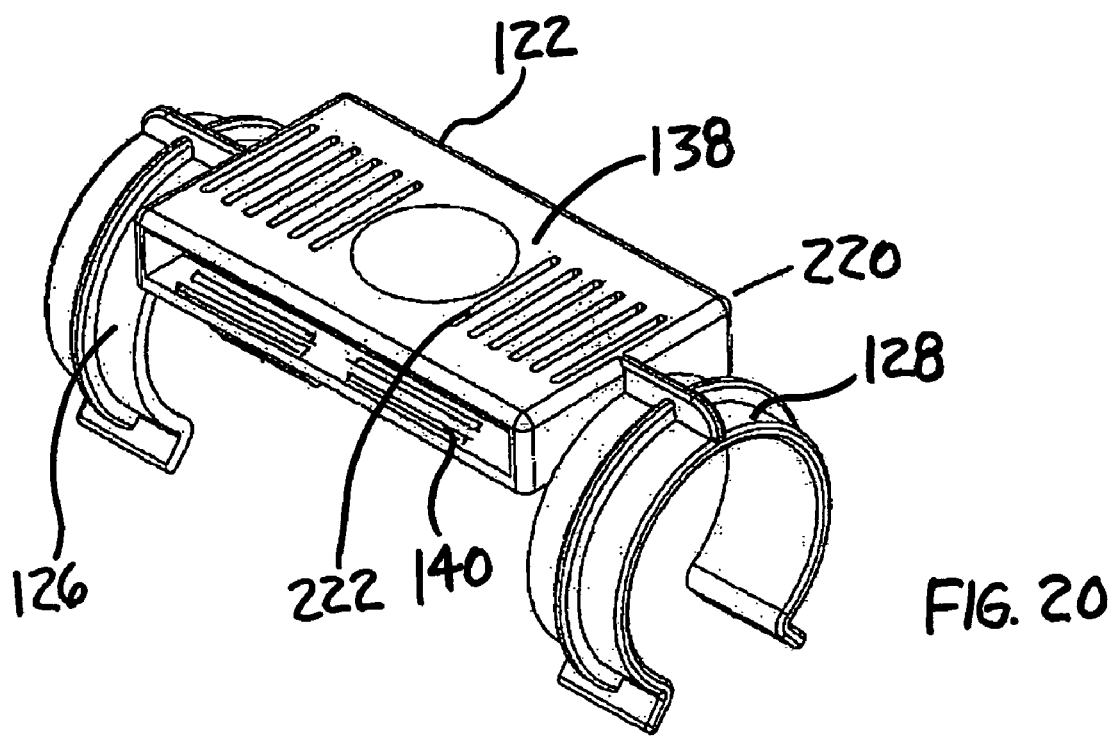
FIG. 20 is a top front perspective view of an orifice shield according to one embodiment of the invention.
Figure 21:
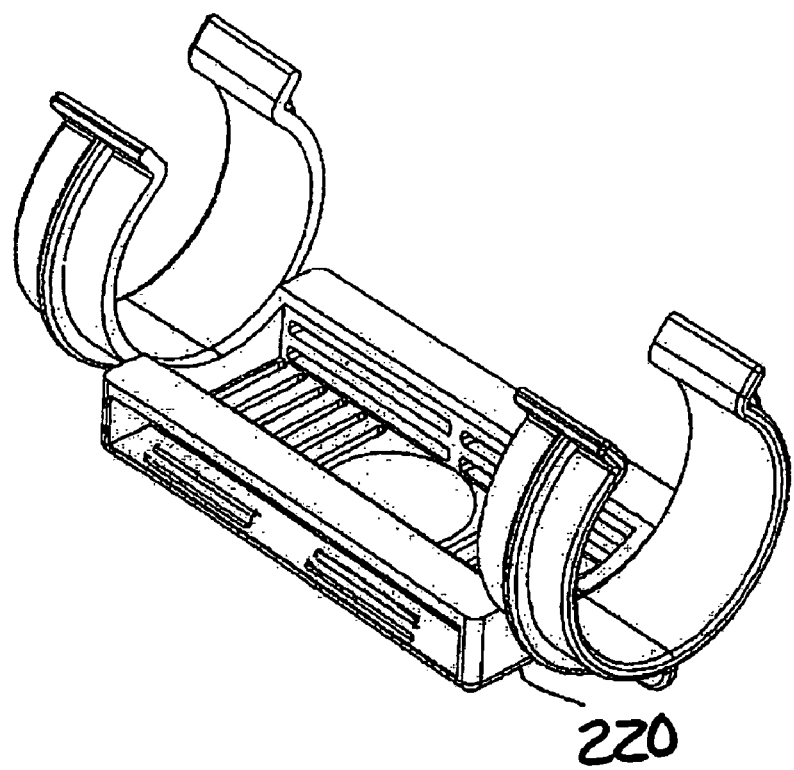
FIG. 21 is a bottom back perspective view of the shield of FIG. 20.
Figure 22:
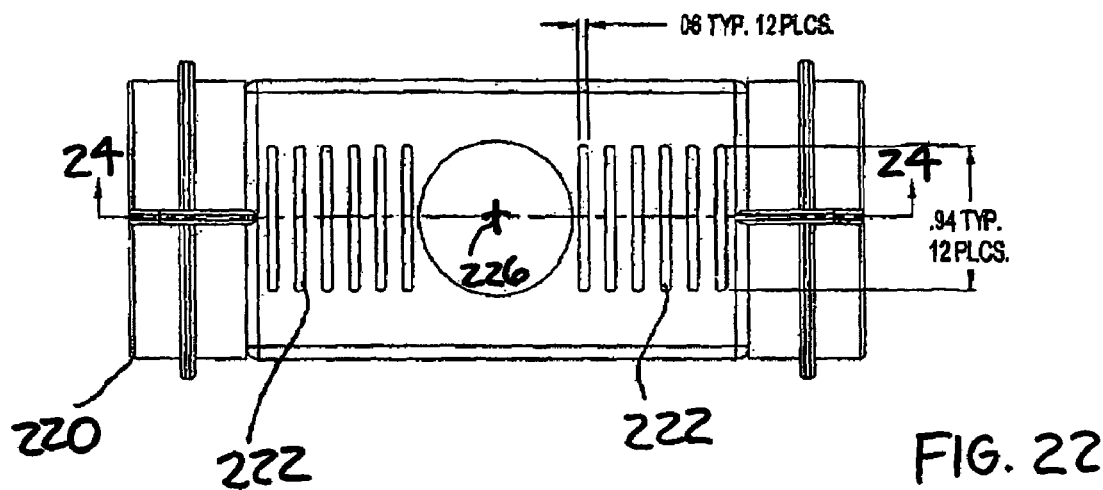
FIG. 22 is a top view of the shield of FIG. 20.
Figure 23:
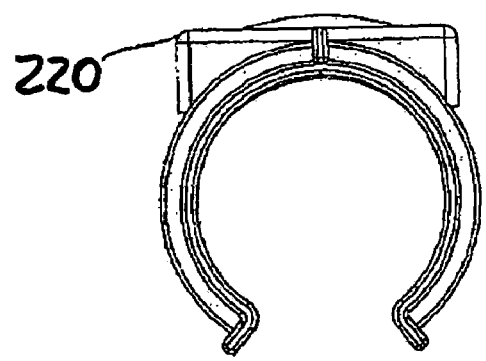
FIG. 23 is a front view of the shield of FIG. 20
Figure 24:
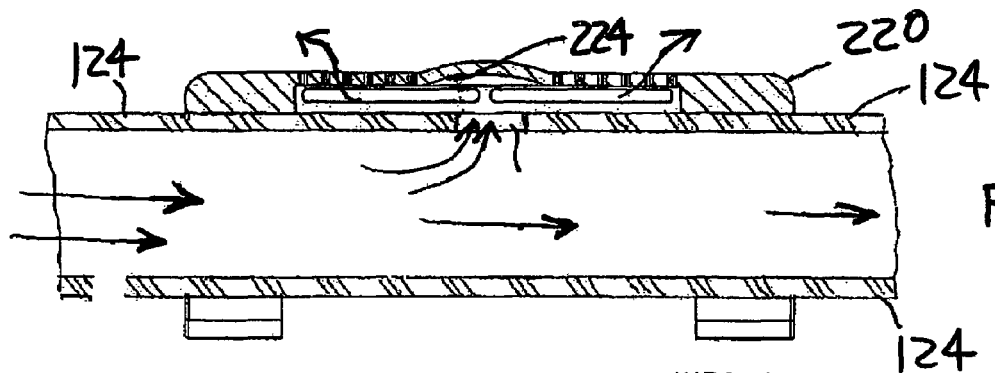
FIG. 24 is a cross section view of the shield of FIG. 22 taken along line 24-24, mounted on a septic system water dispersal pipe shown in cross section.
Figure 25:
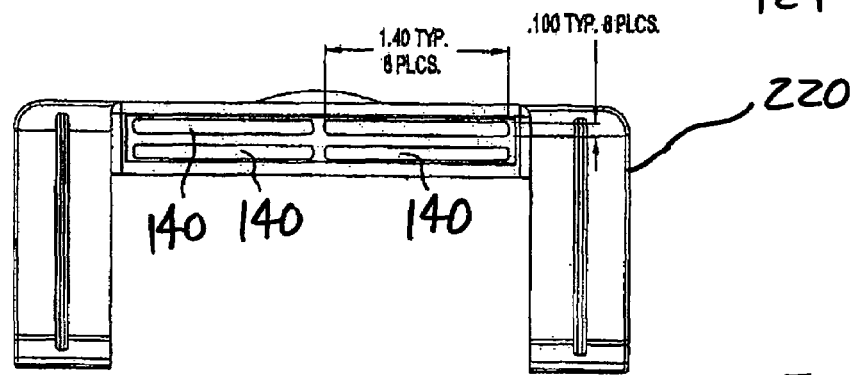
FIG. 25 is a side view of the shield of FIG. 20.
Figure 26:
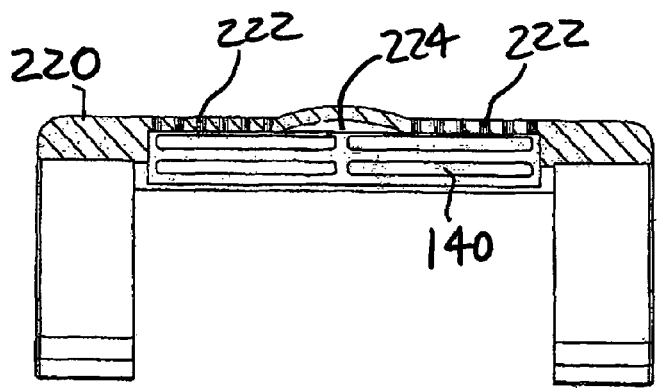
FIG. 26 is a cross section view of the shield of FIG. 22 taken along line 24-24, less the pipe.

Referring now to FIG. 19, in use, waste water 164 in septic system pipe 124 flows out (as indicated by arrows) of drain holes or orifices 166 into box housing 122 and out of the box housing by way of emission holes 140 through longitudinal walls 130, 132 into the soil in which the pipe and orifice shield 120 are buried. Typically, emission holes 140 are slot-shaped and have openings small enough to prevent migration of pebbles into box housing 122 to prevent blockage of the emission holes.

Referring to FIGS. 20-26, another embodiment is an orifice shield 220, which is similar to orifice shield 120. Accordingly, like element numbers are for elements of orifice shield 220 that are similar or the same as those in orifice shield 120. Orifice shield 220 differs from orifice shield 120 in that it includes emission holes 222 that are defined in plate 138 of box housing 122. In addition, orifice shield 220 includes an annular concave surface 224 defined at a center 226 of plate 138. Annular concave surface 224 reflects water evenly back toward openings 140. Annular concave surface 224 typically has approximately a 1.35" spherical radius.

Although the invention has been described and illustrated with respect to exemplary embodiments thereof, it should be understood by those skilled in the art that the foregoing and various other changes, omissions and additions may be made therein and thereto, without parting from the spirit and scope of the present invention. Accordingly, other embodiments are within the scope of the following claims.

What is claimed is:

1. An orifice shield for distributing water flowing from an orifice in a pipe and preventing blockage of the orifice, said orifice shield comprising:

a housing including a cage, said cage being defined by a first plate joined to a second plate via fins, said fins being joined via a plurality of lateral members, said cage including a plurality of openings or slots defined between said fins and said lateral members, said first plate including a central shaft extending downwardly toward said second plate;

a freely rotating fan mounted on said shaft, said fan adapted to evenly distribute the water flowing from the orifice via said openings or slots; and a first clamp extending from said first plate and a second clamp from said second plate, said first and second clamps adapted to be removably secured to the pipe.

2. An orifice shield according to claim 1, wherein said cage is an annular cage and said plates are round in shape.

3. An orifice shield according to claim 1, wherein said cage is an annular cage and said plates are round in shape.

4. An orifice shield according to claim 1, wherein said means for evenly distributing the water is a freely rotating fan mounted on said shaft.

5. An orifice shield according to claim 1, wherein said means for removably securing is a first clamp extending from said first plate and a second clamp from said second plate.

6. An orifice shield for distributing water flowing from an orifice in a pipe and preventing blockage of the orifice, said orifice shield comprising:

a housing including a cage, said cage being defined by a first plate joined to a second plate via fins, said fins being joined via a plurality of lateral members, said cage including a plurality of openings or slots defined between said fins and said lateral members, said first plate including a central shaft extending downwardly toward said second plate;

means for evenly distributing the water flowing from the orifice via said openings or slots;

and means for removably securing said housing to the pipe.

* * * * *